Dec. 9, 1969     C. L. HAMEL ET AL     3,482,323
ELECTRONIC DIAL INDICATOR
Filed July 25, 1967     2 Sheets-Sheet 1
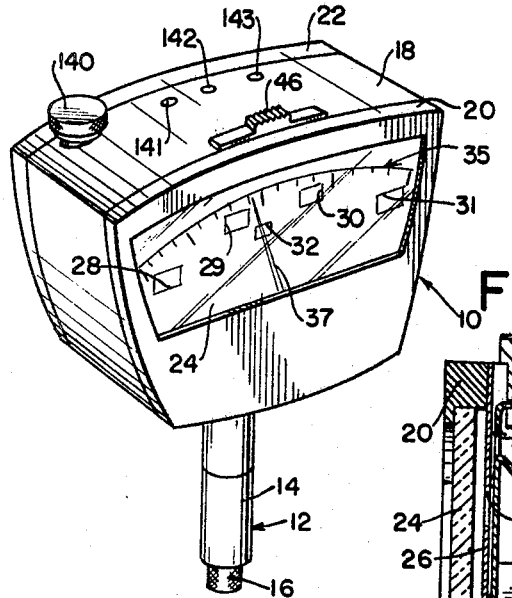
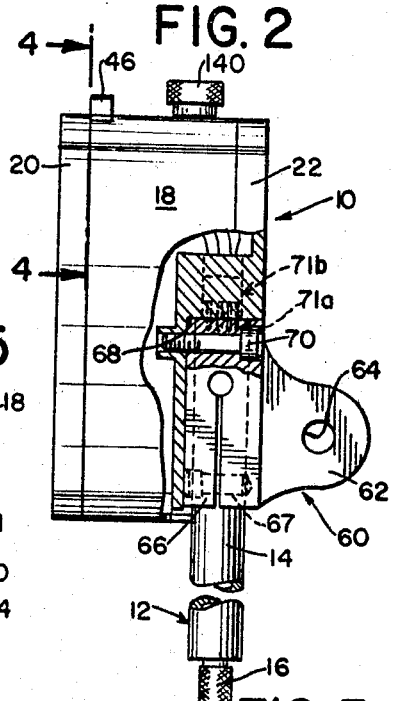
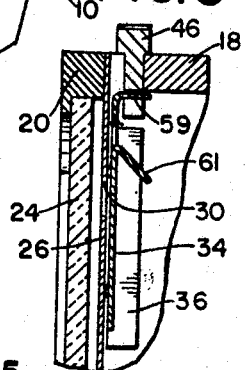
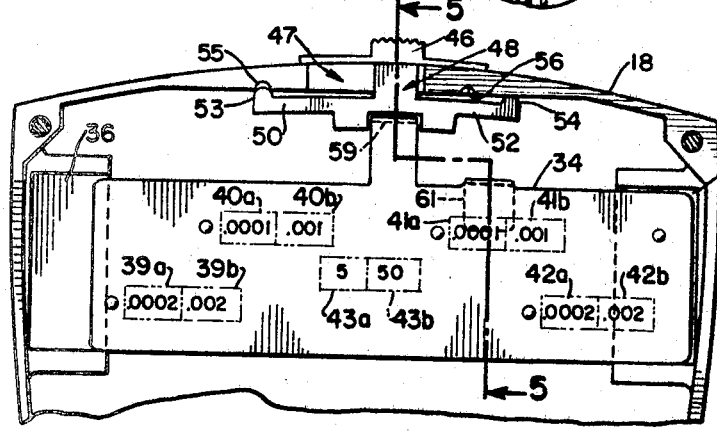
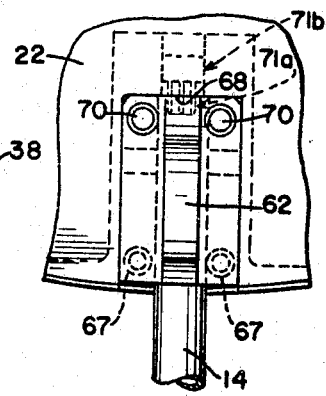
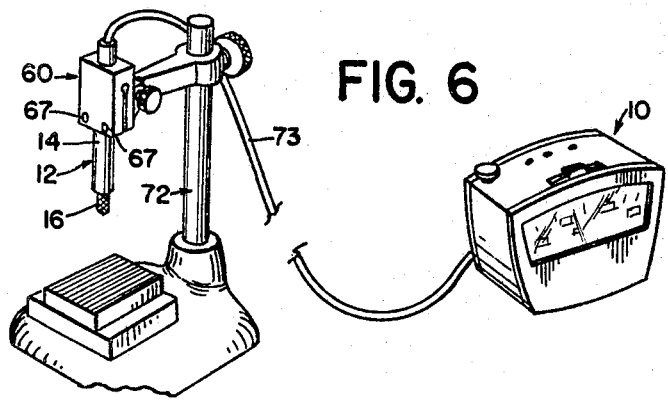
INVENTORS
JAMES P. MURPHY
CONRAD L. HAMEL
JOHN KLINK
BY *Darby & Darby*
ATTORNEYS Dec. 9, 1969  C. L. HAMEL ET AL  3,482,323
ELECTRONIC DIAL INDICATOR Filed July 25, 1967  2 Sheets-Sheet 2

INVENTORS
JAMES P. MURPHY
CONRAD L. HAMEL
JOHN KLINK
BY *Darby & Darby*
ATTORNEYS United States Patent Office 3,482,323
Patented Dec. 9, 1969

3,482,323
ELECTRONIC DIAL INDICATOR
Conrad L. Hamel, Cumberland, R.I., and James P. Murphy, Poughkeepsie, and John Klink, Pine Plains, N.Y., assignors to Standard Gage Company, Inc., Poughkeepsie, N.Y., a corporation of New York
Filed July 25, 1967, Ser. No. 655,797
Int. Cl. G01b 3/22, 5/00; G03b 1/64
U.S. Cl. 33—172
2 Claims

ABSTRACT OF THE DISCLOSURE

An electronic dial indicator comprises a housing for the electronic components and meter, a separate gage head, and a detachable retainer consisting of an A.G.D. mounting lug and a heavy clamping portion for retaining the gage head. The gage head is thus rigidly mounted in the retainer which may be connected directly to the housing or mounted separately attached to the electronic circuitry within the housing by means of a cable. The electronic circuit within the housing includes an oscillator connected to the primary of an LVDT by means of an emitter follower. The LVDT secondary is connected through an impedance matching network to an amplifier. The amplifier output is passed through a discriminator circuit to a conventional meter.

This invention relates to electronic dial indicators or devices which provide a meter indication of the deflection of a stylus or the like by electronic means. By way of example, electronic dial indicators are frequently used with different types of gages to provide an accurate indication of the measurements taken by the gage.

An electronic dial indicator requires a substantial amount of amplification as well as linear amplification over a range of input values. Principally for these reasons a relatively complex circuit is required which, because of its size, must be housed separately from the actual measuring transducer or stylus. There are, however, many situations where it is desirable for the indicator itself to be physically located immediately adjacent the gage head or measuring stylus, as is typically the case with most mechanical indicators. Despite the significant advances made in the art of miniaturizing electronic components, there are no commercially available electronic dial indicators wherein the transducer, electronic circuits, and indicating means form a single unitary construction. Suggested constructions (see, for example, Neff Patent No. 2,583,791) have, in practice, proved to be impractical for various reasons.

The present invention seeks principally to provide such a construction by providing certain unique mechanical features which enhance the degree of miniaturization possible using commercially available components.

According to the invention, an electronic dial indicator comprises a housing for the electronic components and meter, a separate gage head, and heavy retaining means including an integrally formed mounting lug for mounting the gage head in accordance wtih industry standards such that the gage head is incapable of movement with respect to the mounting lug. The retaining means preferably is detachable from the housing, whereby the gage head may be mounted directly on the housing or it may be mounted separately and attached to the electronic circuitry within the housing by means of a cable.

FIGURE 1 is a perspective view of an electronic dial indicator according to the invention in which the gage head is connected directly to the meter;

FIGURE 2 is a side view partially in section of the indicator shown in FIGURE 1;

FIGURE 3 is a detailed rear view showing how the gage head retainer is connected to the housing;

FIGURE 4 is a front sectional view along the line 4—4 of FIGURE 2;

FIGURE 5 is a sectional view along the line 5—5 of FIGURE 4;

FIGURE 6 is a perspective view showing the manner in which the gage head and housing may be separately mounted;

Figure 8:
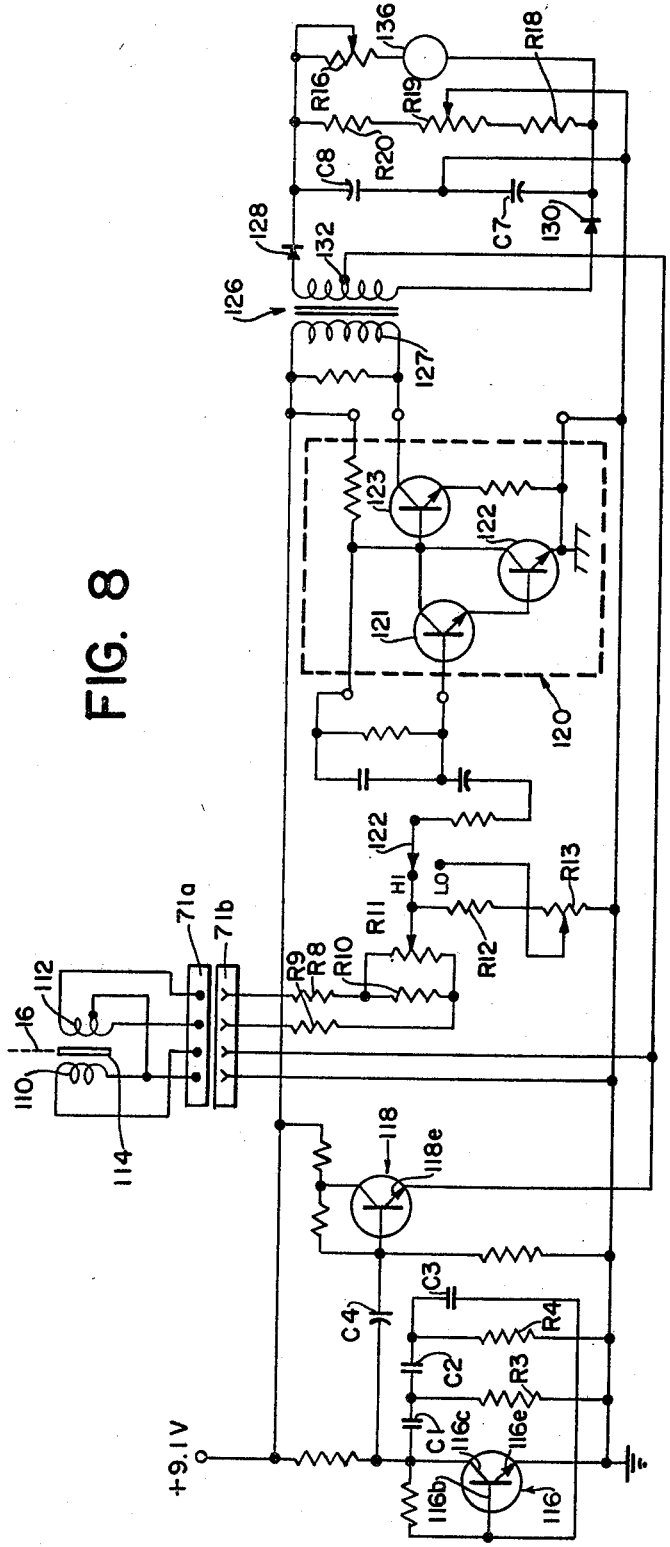
FIGURE 8 is a schematic diagram of the circuit contained within the housing and gage head.

FIGS. 1–5 illustrate the mechanical features of the invention which consists of a housing 10 for the electronic circuits and meter and a detachable gage head 12. The gage head 12 includes a sleeve 14 in which a spring biased stylus 16 is mounted for vertical movement. Gage head 12 may include a standard electro-mechanical transducer wherein vertical movement of the stylus 16 is converted into an electrical output voltage by means of appropriately connected transformer windings. The electrical circuit of the gage head is described below and may be of the type commonly referred to as a linearly variable differential transformer (LVDT).

The housing 10 consists of a closed body 18, a front panel 20 and a back plate 22. These parts may be made of cast aluminum and are secured together in any suitable fashion as, for example, by screws.

The front panel 20 includes an open viewing area in which a window 24 is mounted with a suitable calibrated dial face 26 being positioned behind the window 24. The dial face 26 contains five small rectangular apertures 28, 29, 30, 31 and 32 which cooperate with a slidable scale plate 34 mounted behind the dial face 26 to indicate the sensitivity range to which the dial indicator has been set. Additionally, a meter scale 35 is printed upon the dial face 26 and cooperates with the meter pointer 37 to enable visual readout of the measured value.

The slidable scale plate 34 reciprocates in opposing runways 36 and 38 formed within the body 18. Scale plate 34 contains five pairs of written legends identified as 39a, b through 43a, b (see FIG. 4). One legend of each pair of legends will appear in the respective dial face windows 28–32 depending upon the position of the scale plate 34 within the body 18. For example, in the position illustrated in FIG. 4 the legends 39a–43a will appear in windows 28–32. If the plate is moved all the way to the left, the legends 39b–43b will appear in the windows. By way of example, if the indicator has two sensitivity ranges differing by a factor of ten, the indication appearing in windows 28–31 may represent a maximum deflection (in either direction) of .0002 inch or .002 inch, with the numbers appearing in window 32 indicating that each scale division of the scale 35 represents a deflection of five or fifty millionths of an inch, respectively.

To move the scale plate 34, a cover slide 46 mounted externally of housing 10 cooperates with a T-shaped connecting member 48 which is slidable within an elongated aperture 47 interior of the housing 10. The connecting member 48 includes two opposing arms 50 and 52 of resilient material which have upstanding detents 53 and 54, respectively, at the opposite ends thereof, and which are held in tension by cover slide 46. Detents 53 and 54 are adapted to mate with indentations 55 and 56, respectively, to secure the scale plate 34 in either of its two operable positions. The plate 34 contains an upstanding integrally formed protrusion 59 which is bent transversely into engagement with a suitable notch in the connecting member 48. Thus, movement of the cover slide 46 causes member 48 to push the plate 34 back and forth within the runways 36 and 38. A downwardly bent tab 61 functions as a switch actuator to set the meter sensitivity, as explained below, when the scale plate 34 is moved. The use of a slidable plate such as 34, as compared to a standard rotary switch, also enhances the degree of miniaturization possible.

An important aspect of the invention consists in the provision of a separate gage head retainer 60 (see FIG. 2) in which the gage head 12 is mounted. The general function of the gage head retainer 60 is to provide a fixed standard for mounting the stylus with extreme accuracy so that the minute stylus movement can be accurately measured. Thus, gage head retainer 60 includes a rearwardly extending mounting lug 62 in which a bore 64 is centrally formed. A gage head mounting means (not shown), which may be conventional, includes a suitable member which is retained within the bore 64. The gage head 12 is retained within a heavy split clamping portion 66 of the retainer 60 and two screws 67 tighten the clamping portion 66 onto the gage head 12 so as to rigidly connect gage head 12 and mounting lug 62 together, the distance between the axis of gage head 12 and the diameter of mounting bore 64 complying with a known standard, for example, A.G.D. (American Gage Design) specifications.

The back plate 22 of indicator 10 includes a recess 68 which mates snugly with the split mounting portion 66. In addition, the gage head retainer 60 is secured to indicator 10 by two screws 70 which clamp the mounting portion 66 to the back plate 22. As shown in FIG. 2 when the retainer 60 is secured to the back plate 22 a female electrical connector 71a at the top of gage head 60 mates with a corresponding male connector 71b in the top wall of recess 68.

Miniaturization of the device is enhanced by the gage head retainer means of the invention. Thus, it is necessary to maintain rigidity between gage head 12 and mounting lug 62. If the mounting lug 62 were permanently attached to the back plate 22 of indicator housing 10 with the gage head 12 extending from the indicator in a conventional way, the likelihood of displacement between lug 62 and gage head 12 would be substantial, since, in the interests of space economy, back plate 22 is of relatively light construction and likely to flex under even light stress. However, according to the invention, the gage head retainer 60 includes a heavy (substantially inflexible) clamping portion 66 integrally formed with the mounting lug 62 for physically holding the gage head 12. Hence, under all normal operating conditions, the gage head 12 will be immovable with respect to mounting lug 62, and a bulky housing construction is not required to assure this rigid connection.

Conceivably, the illustrated retainer 60 and back plate 22 could be formed as a unitary member to provide the basic advantages of the invention, however, the illustrated embodiment of the invention additionally permits physical separation of the gage head 12 and indicator 10 should it be desired. For example, as shown in FIG. 6, the gage head retainer 60 is mounted on a standard height stand 72 away from the dial indicator 10 but connected thereto by means of a cable 73 cooperating in an obvious fashion with the connectors 71a and 71b on gage head 12 and housing 10, respectively.

The preceding discussion relates only to the mechanical construction of the invention. Obviously, the physical arrangement of the electronic components within the housing 10 in itself is not a material feature of the invention. Accordingly, in the interest of clarity, no electrical components have been illustrated in FIGS. 1–6.

The electrical circuit within housing 10 also includes certain novel features which provide important advantages in an electronic dial indicator. The circuit is described with reference to FIGURES 7 and 8.

Figure 7:
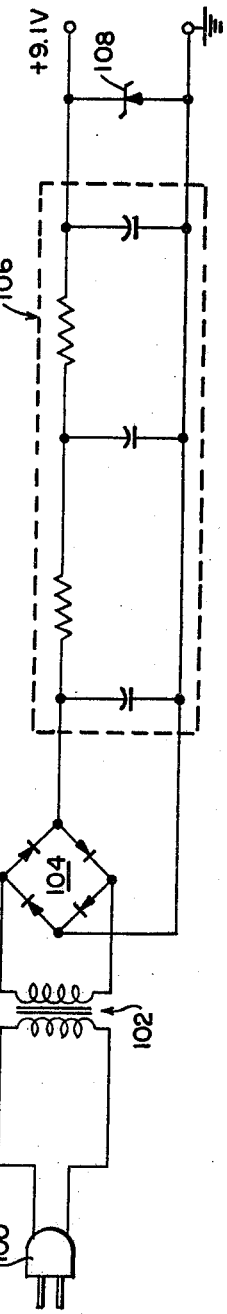
FIGURE 7 is a schematic diagram of the power supply contained within the housing of FIGURE 1.

The power supply shown in FIG. 7, is conventional and includes a plug 100 which may be inserted into a standard 115 volt A.C. receptacle to couple alternating voltage to a step-down transformer 102, the secondary of which is coupled to a full-wave rectifier 104. The output of the rectifier 104 is fed through a filter 106 across a Zener diode 108 to produce a regulated output voltage. By way of example, the output voltage may be approximately 9.1 volts D.C.

The LVDT (FIG. 8) in gage head 12 includes a primary coil 110 and a secondary coil 112. As is well known, the amplitude of the secondary output voltage is dependent upon the position of a core 114 which is directly coupled to the gage head stylus 16 (FIG. 1). The connecting leads for the LVDT are connected to the female plug 71a which mates with male socket 71b (see FIG. 2) so as to couple the oscillator signal to the LVDT primary 110, and the output of the LVDT secondary 112 to the amplifying circuits. When core 114 is in the exact center there is no output voltage from secondary 112. If core 114 is displaced up or down the secondary voltage will vary linearly in amplitude with the phase indicating the direction of displacement.

The oscillator is a standard phase shift oscillator having a frequency of, for example, five kilocycles. It comprises a transistor 116 and a phase shifting network which consists of capacitors C1, C2, and C3, and resistors R3 and R4. The emitter 116e of transistor 116 is grounded so that the phase relationship between the base 116b and collector 116c of transistor 116 would normally be 180°. The phase shifting network between the collector and base provides an additional phase shift of 180° or a total phase shift of 360° which will sustain oscillation. The frequency of the oscillator is determined by the values of capacitors C1, C2 and C3 and resistors R3 and R4.

The oscillator output is connected through a coupling capacitor C4 to the base of an emitter follower 118. The emitter follower 118 is used to couple the output of the oscillator to primary 110 of the LVDT since direct coupling between the oscillator and low impedance primary 110 would cause undesirable loading of the oscillator. As a feature of the invention, the primary winding 110 (when connector 71a is inserted into connector 71b) is connected in series with the emitter 118e of emitter follower 118. With the primary winding 110 serving as part of the output impedance of the emitter follower 118, the output thereof approximates sine wave with minimum current being drawn. Avoidance of a coupling transformer saves space and the lack of D.C. isolation has not proven harmful.

The output of the LVDT secondary 112 is connected to a resistive impedance matching network comprising resistors R8, R9, R10, and R11. R11 serves as a voltage divider from which the input voltage to an audio amplifier 120 is taken. A variable resistance comprising a resistor R12 and potentiometer R13 serves as a voltage attenuator between the impedance matching network and amplifier 120.

A range selector switch 122 is connected between voltage divider R11 and amplifier 120 to attenuate the LVDT output, depending upon the selected meter sacle. Thus, in the high sensitivity position HI the amplifier input voltage is the full voltage across resistors R12 and R13. When switch 20 is switched to the low position LO the resistors R12 and R13 serve as a voltage divider network to couple an attenuated voltage to amplifier 120. By way of example, the attenuation provided may be ten, i.e. the high scale is ten times as sensitive as the low scale.

Amplifier 120 may be a commercially available integrated amplifier comprising three transistors 121, 122 and 123 all grown on one silicon chip. Amplifier 120 is a constant gain amplifier and therefore always operates over the desired portion of its dynamic range characteristics regardless of the selected sensitivity range.

The discriminator circuit is amplitude and phase sensitive and comprises a transformer 126 and diodes 128 and 130. The output of amplifier 120 is connected across the transformer primary 127, the amplitude of this signal representing the deflection of the stylus and phase indicating whether the deflection is "up" or "down." The reference signal from the emitter follower 118 is coupled to the center tap 132 of the transformer secondary (so that a portion of the secondary of transformer 126 in parallel with LVDT primary 110 serves as the total output impedance of emitter follower 118), with the result that current will flow in a direction depending upon the direction of stylus deflection. Capacitors C8 and C7 along with resistors R18 and R20 filter out the five kilocycle component so that it does not reach the meter. The center tap of a potentiometer R19 is grounded for balancing purposes as described below. A standard D'Arsonval meter 136 is connected across the output resistors R18, R19 and R20 and in series with a gain adjusting potentiometer R16 which, as explained below, adjusts the gain for the high sensitivity range selection.

The basic operation of the circuit should be apparent from the preceding discussion. The alternating output across the secondary 112 of the LVDT is amplified by amplifier 120 and, depending upon the phase thereof, a signal whose amplitude is representative of stylus deflection will flow through diode 128 and resistor R20, or diode 130 and resistor R18, through a portion of potentiometer R19 to ground. This voltage output is then measured by the meter 136 which is calibrated to provide a direct reading of stylus deflection depending upon the selected range.

An important feature of the invention is the arrangement of the gain adjustment controls for the high and low sensitivity scales as well as the particular balancing means, A description of the calibration procedure by which the respective potentiometers balance the dial indicator will illustrate the advantages of the circuit.

After the instrument is turned on, range selector switch 122 is set to HI and the meter pointer brought as closely as possible to its zero position (using a known standard for measurement purposes). Then the tap of potentiometer R11 is adjusted to bring the meter pointer precisely to zero. Because of the change in input impedance in switching between the high and low sensitivity positions, when range selector switch 20 is moved to the LO position, the meter 136 will no longer be perfectly balanced. Thus, the sensitivity switch is placed in the low position and potentiometer R19 adjusted until the meter pointer is again precisely at the zero position. The above procedure is then repeated two or three times, or until the meter pointer stays precisely at zero when the range selector switch is switched between the HI and LO positions.

To adjust the gain control, the stylus 16 is deflected a known amount by a standard and the gain of the system is adjusted by varying the potentiometer R16 until meter 136 reads the precise value corresponding to the known standard. The range selector switch is then set to the LO position and a new standard substituted. The potentiometer R13 is then adjusted until meter 136 reads the precise value corresponding to the new standard. At this point the dial indicator is ready for use on either the high or low sensitivity scales.

Obviously, the elements which must be adjusted will include actuator members extending from the housing to permit calibration without dismantling the indicator. For example, a knob 140 (FIG. 1) may be used to adjust the zero adjust potentiometer R11. Suitable screws 141, 142 and 143 may adjust potentiometers R13, R16 and R19, respectively. The slide 46, which changes the scale reading, may actuate the switch 122 by means of the protrusion 61 (FIG. 5) in an obvious manner.

The invention is not limited to any specific use. One such use would be as an electronic comparator where the deviation of a workpiece from a prescribed norm would be indicated on the meter. The invention could also be used with bore gages, snap gages, depth gages and, in fact, any other type of gage or measuring device where an electronic indication of mechanical deflection is desired.

What is claimed is:

1. In an electronic dial indicator, including a housing and a gage head containing a stylus and means for converting the mechanical displacement of such stylus to an electrical signal, wherein circuit means are provided within said housing responsive to said signal for indicating the relative magnitude of said displacement, the improvement comprising:
    gage head retainer means for rigidly retaining said gage head, said retainer means including
        means for detachably connecting said retainer means to said housing,
        a mounting lug for mounting said gage head on a support member with at least one dimension between said mounting lug and gage head conforming to a predetermined standard, and
        a clamping portion for rigidly clamping said gage head to said mounting lug whereby said dimension remains fixed regardless of relative movement between said housing and said mounting lug, and
    first and second electrical connector means associated with said housing and said gage head, respectively, and adapted to detachably mate with each other for coupling said electrical signal to the circuit means within said housing.

2. An electronic dial indicator according to claim 1, wherein said housing includes a rear recess for receiving said retainer means.

References Cited

UNITED STATES PATENTS

| 2,065,951 | 12/1936 | Terry. | |
| 2,541,535 | 2/1951 | Neff | 33—170 |
| 2,583,791 | 1/1952 | Neff. | |
| 3,106,023 | 10/1963 | Wilson | 33—170 |

HARRY N. HAROIAN, Primary Examiner